US005682384A

United States Patent [19]
Zarros

[11] Patent Number: 5,682,384
[45] Date of Patent: Oct. 28, 1997

[54] APPARATUS AND METHODS ACHIEVING MULTIPARTY SYNCHRONIZATION FOR REAL-TIME NETWORK APPLICATION

[75] Inventor: Panagiotis N. Zarros, 21-48, 35th St. Apt. 4B, Astoria, N.Y. 11105

[73] Assignee: Panagiotis N. Zarros, Astoria, N.Y.

[21] Appl. No.: 550,617

[22] Filed: Oct. 31, 1995

[51] Int. Cl.$^6$ .................. H04J 3/06; H04L 7/04
[52] U.S. Cl. .................. 370/394; 370/517; 375/371
[58] Field of Search .................. 348/15, 16; 360/26, 360/36.1, 36.2, 37.1; 375/354, 356, 371; 379/67, 88, 89, 202; 370/259, 260, 263, 266, 267, 389, 394, 428, 503, 505, 506, 516, 517

[56] References Cited

U.S. PATENT DOCUMENTS

| | | | |
|---|---|---|---|
| 3,843,930 | 10/1974 | Burnsweig | 370/108 |
| 5,526,353 | 6/1996 | Henley et al. | 370/100.1 |
| 5,533,021 | 7/1996 | Branstad et al. | 370/100.1 |

OTHER PUBLICATIONS

Rangan, et al. "Communication Architecture and Algorithms for Media Mixing in Multimedia Conferences", IEEE/ACM Transactions on Networking, vol. 2, pp. 20–47, Feb. 1993.
Ramanathan, et al. "Adaptive feedback techniques for synchronized multimedia retrieval over Integrated Networks", IEE/ACM Trans on Networking, vol. 2, pp. 246–260, Apr. 1993.
P. Zarros, et al. "Statistical Synchronization among participants in real–time multimedia conference", Proceeding of IEEE Infocom '94, Toronto CA, pp. 912–919.
P. Zarros, "Multimedia Network Synchronization In Real-–Time Applications", Ph.D. Thesis, Graduate Center, The City University of New York, Jun. 1995.
Rangan, et al. "Designing an on demand multimedia services", IEEE Communications magazine, vol. 30, pp. 56–65, Jul. 1992.
Barberis, et al. "Analysis and optimal design of a packet voice receiver", IEEE Transactions on Communications, com–39, pp. 217–227, Feb. 1980.
Montgomery "Techniques for Packet Voice Synchronization", IEEE Journal for selected areas in Communications, No. 6, pp. 1022–1027, Dec. 1983.
Alvarez–Cuevas, et al. "Voice synchronization in Packet switching Networks", IEEE Network magazine, vol. 7, No. 5, pp. 20–25, Sep. 1993.

*Primary Examiner*—Alpus H. Hsu

[57] ABSTRACT

In network applications that are distributed across more than two hosts in the network, a scheme capable of synchronizing and grouping packets into the so called fusion sets for playback is needed. Those packets arrive from different sources at a receiver, where they are "mixed" together for playback. The receiver can be one of the hosts/sources in the application, or a master host where packets from all the hosts arrive there first and subsequently are being forwarded back to all hosts. Basically, the apparatus and method operates as follows: the receiver accepts packets from other sources, and for each packet it computes its reference time (or expected arrival time). At the receiver, time is divided into reference intervals. Packets, one packet from each source, that their corresponding reference times are within the same reference interval at the receiver, they belong to the same fusion set for synchronization. In addition to reference times, the method/apparatus uses the so named zeta times which are constructed from the reference times by adding a constant time interval to the reference times of the same source, and this constant may or may not be the same for each source. The transmission of the packets is non-continuous periodic and the generation periods of the packets may be integer multiple to a fundamental period T. In addition, the use of feedback and of smaller reference intervals are shown to shorten the total delay time of the packets in the fusion set.

36 Claims, 8 Drawing Sheets

APPARATUS AND METHODS ACHIEVING MULTIPARTY SYNCHRONIZATION FOR REAL-TIME NETWORK APPLICATION

BACKGROUND OF THE INVENTION

1. Field of the Invention

The present invention relates to a method and an apparatus for synchronizing packets arriving at a receiver (a computer host in the network, which may be a regular participant or a central host) from other hosts, and those packets when "played back" at the receiver (played back for voice packets; displayed for video packets) have to conform to certain timing relations among them. The determination of the set of packets that are to be played back together, are defined as "fusion sets". In addition, an apparatus/method for synchronizing multimedia packets emanating from a single source at the receiver.

2. Description of the Prior Art

Herein apparatus and methods for multiparty synchronization in the presence of noncontinuous periodic traffic in real-time applications that determine the fusion sets of the packets for playback are presented. Packets, one from each source, that belong to the same fusion set, will be played back (or mixed for the purpose of playback) at the same time at the receiver. The proposed multimedia synchronization methods are based on statistically evaluating the reference times or expected arrival times of the packets from each participant in each connection. Once the reference times are estimated, synchronization is achieved not according to the generation times of the packets but according to their expected arrival times. This concept has lots of merits, particularly the merit that it permits the receiver to decouple the synchronization dealing with packets arriving from one participant from the synchronization dealing with packets arriving from the other participants. In addition, for the same reason it exhibits the optimum delay. To clarify these points more, suppose a multimedia conference is held among three participants. One of them is located in New York, another in New Jersey, and the third in California. Then packets arriving from New Jersey to the participant located in New York, will only experience the average time delay expected in the connection from New Jersey to New York. Similarly, packets arriving from California will only experience the average time delay expected in the connection from California to New York. This has as an end result that the case of Interparticipant synchronization can logically be broken into M parts (assuming M participants in a multimedia conference), one for each participant.

In "Communication Architectures and Algorithms for Media Mixing in Multimedia Conferences" by Rangan et al. Appeared in IEEE/ACM Transactions on Networking, pp. 20–47, Feb. 93 ([1]), and in "Adaptive Feedback Techniques for Synchronized Multimedia Retrieval over Integrated Networks" by Ramanathan et al. appeared in IEEE/ACM Transactions on Networking, pp 246–260, April 1993 ([2]), their methods were achieving synchronization according to the generation times of the packets. This means, that if packets were generated at the same time (or within a very small time window), they were played back together at the receiver. To find out whether packets were generated it the same time, feedback packets in order to estimate the actual time delay of the packets of each participant were used. Or, the assumption of global network clock was assumed, which means that the generation times of the packets were known to the receiver by simply carrying their generation timestamp. There are many disadvantages of their methods. Their methods require feedback packets in order for the actual time delays to be estimated, or a global clock is needed. In addition, packets emanating from sources nearest to the receiver are punished with extra time delay so that their playback times become equal with the packets emanating from the source which is the furthest away from the receiver.

In U.S. Pat. No. 3,843,930 by Burnsweig, U.S. Pat. No. 5,526,353 by Branstad et al., and U.S. Pat. No. 5,533,021 by Henley et al., descriptions of methods and apparatus for synchronizing multimedia and/or voice data packets emanating from a single source are presented. However, the present invention describes a method and an apparatus for synchronizing packets emanating from different sources. In addition, the present invention describes methods and apparatus for sending packets to a receiver non-continuously but periodically, and the receiver accepting packets from such a source.

Although it is been one year from the time of publication of "Statistical synchronization among participants in a real-time multimedia conference" by Zarros et al. in the proceedings of IEEE Infocom '94, pp 912–919 ([3]), many improvements based upon the contents of this paper are presented here. Some of the improvements are contained in my Ph.D. Thesis "Multimedia Network Synchronization In Real Time Applications", the Graduate Center of the City University of New York, June 1995([4]), but many of them do not appear anywhere else. The improvements that are contained in my Ph.D. Thesis are: 1) The use of feedback to reduce the reference interval at the receiver; 2) the traffic is non-continuous periodic; and 3) sources generate packets with period that can be an integer multiple of a fundamental period T. Improvements that do not appear anywhere else are the following: 1) the reference interval, when no feedback is used, is reduced to the minimum theoretical value; and 2), the use of the zeta times, and a special case of those the individual playback times. The zeta times are constructed from the reference times, and they are a generalization of the reference times.

SUMMARY

We have presented a multiparty synchronization method and an apparatus for real-time network applications, such as multimedia conferencing. Specifically we have presented the following. We have provided a mechanism at the receiver to estimate the playback time of the packets using the concept of the reference times or average arrival times. This was achieved by modeling the traffic of the voice (or video) packets as noncontinuous periodic. This means that at the sender, even if packets will be generated aperiodically, we will insert "empty" data in the packet to make the generation times of the packets periodic. If the silent interval exceeds the time length of one packet, then the sender might not send any packets at all. For this reason, we call the traffic noncontinuous periodic. Once the traffic is such as described, the receiver can easily determine the reference times of the packets. Once again, reference time of a packet is the time that the packet would arrive at the receiver, if only had experienced the average time delay that packets in this connection experience. Given the reference times of the packets, then we can also easily determine the individual playback times of the packets from each source ($t_{pb,n}^{i} = t_{ref,n}^{i} + \hat{\Delta}_{max}^{i} + \mathcal{E}_T$). A generalization of the reference times are the zeta times, that can be constructed from the reference times of the packets by adding a constant time interval $X^i$ to each reference time from a common source, but this constant time interval might be different for different sources. The zeta times are defined as follows $t_{z,n}^{i} = X^i + t_{ref,n}^{i}$.

Subsequently, improvements and extensions to more than one period of the interparticipant synchronization method presented in "Statistical synchronization among participants in a real-time multimedia conference", by Zarros et al. in the proceedings of IEEE Infocom '94, pp 912–919, were presented. In the basic method in "Statistical synchronization among participants in a real-time multimedia conference", by Zarros et al. in the proceedings of IEEE Infocom '94, pp 912–919, packets from different sources were found to belong to the same set for playback at the receiver, only if their reference times were within the same reference interval of length T, where T is the common generation time of the packets for all the sources. Three basic types of improvements were made. First, instead of using the reference times, it is shown that we get better results by using the playback times. That means, that we group packets from different sources together if their playback times ($t_{pb,n}{}^i = t_{ref,n}{}^i + \hat{\Delta}_{max}{}^i + \mathcal{E}_T$) were within the same reference interval T. We immediately have a gain equal to the difference of $\max_i\{\hat{\Delta}_{max}{}^i\} - \hat{\Delta}_{max}{}^i$, where i is any of the sources. For different applications that have various time delay constraints, we can use the zeta times in a similar way.

A second improvement is achieved when, instead of using as a reference interval the common generation period T, we use the minimum theoretical value that guarantees us that the reference time or playback time of one packet from each source will be within this interval. This minimum theoretical value is $$T - \frac{T}{2^{M-1}},$$

where M is the number of sources. Immediately we see that the gain in the waiting time for playback is $$\frac{T}{2^{M-1}},$$

which is considerable large if M=3 or 4. The first and the second improvement can be combined to lead to a better improvement.

The third improvement has to do with feedback. By using feedback, we can eliminate further the reference interval, either this T or $$T - \frac{T}{2^{M-1}}.$$

This improvement can be used when either the reference times or the playback times are used to determine the set of packets that have to be played back together at the receiver. In case there is a mechanism that permits the receiver to estimate the frequency offsets between the clocks at the source and at the receiver, the length of the reference interval becomes $|N(T^j - T^R)|$, where j is the source that exhibits the maximum frequency offset with respect to the clock at the receiver, i.e. $(T^j - T^R)$ is maximum. In case the receiver could only determine the direction of the frequency offset of the clocks and not the actual value, i.e. whether the clock of a source is faster or slower than its own clock, then the reference interval achieved would be $|N(T^S - T^R)|$, where s is a hypothetical source in the network that exhibits the maximum frequency offset from the receiver's clock.

Feedback can also be used when no mechanism that estimates the frequency offsets of the clocks with respect to the clock at the receiver exists. In this case, the minimum reference interval that can be achieved is $2|N(T^S - T^R)|$, where s is a hypothetical source in the network that exhibits the maximum frequency offset from the receiver's clock. We immediately see the improvements in the waiting time for playback, which for the case the initial reference interval was $T = T^R$, the improvements will be $T^R - |N(T^j - T^R)|$, $T^R - |N(T^S - T^R)|$, and $T^R - 2|N(T^S - T^R)|$ respectively. A typical value of $(T^S - T^R)$ will be $10^{-3} T^R$.

An expansion to the apparatus and method to cover cases of sources generating packets with integer multiple of a fundamental period $T_F$ were also presented. We have presented the cases where the reference times and the playback times are used. These cases can be combined with the improvement which has to do with using as a reference interval the window $$T_f - \frac{T_f}{2^{M-1}}.$$

The feedback schemes presented for the singular case (one common period) can also be used for the case of sources transmitting packets with periods which are integer multiples to a fundamental period. The traffic generating from the sources is not necessary to be continuous, but it can have "silent" intervals in between, i.e. the methods/apparatus are shown to work also when traffic is non-continuous periodic.

where M=3.

Figure 7:
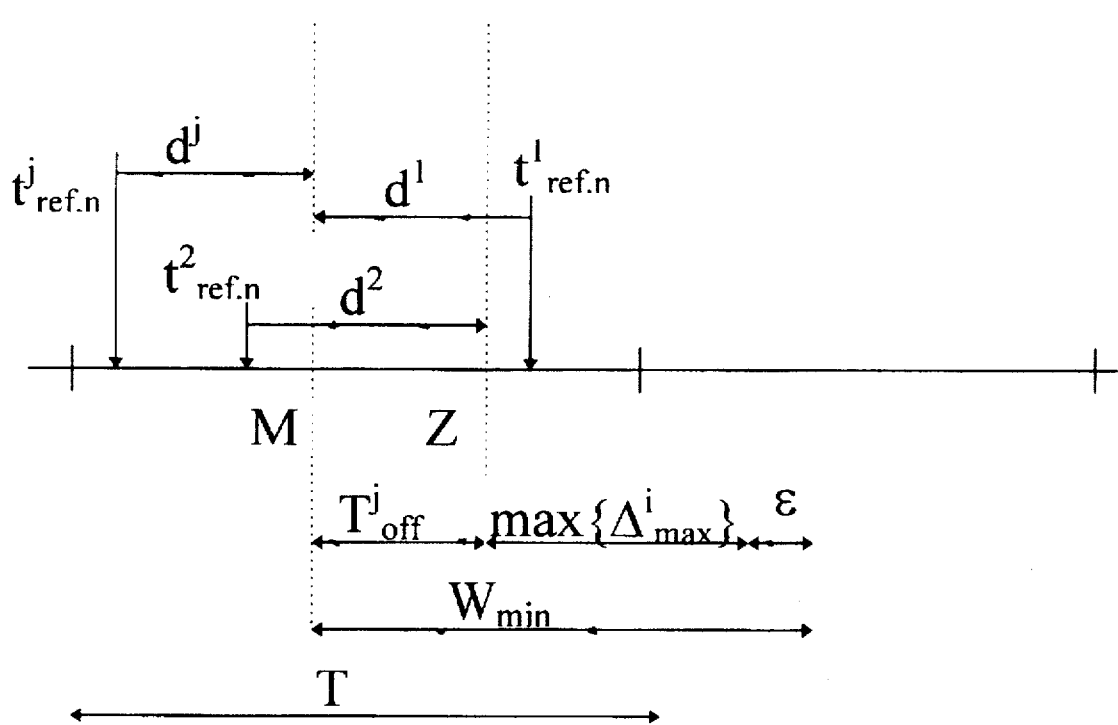

FIG. 7 Determination of the distances $d^i$ the reference time of each source i has to be readjusted after the reception of a feedback packet.

Figure 8:
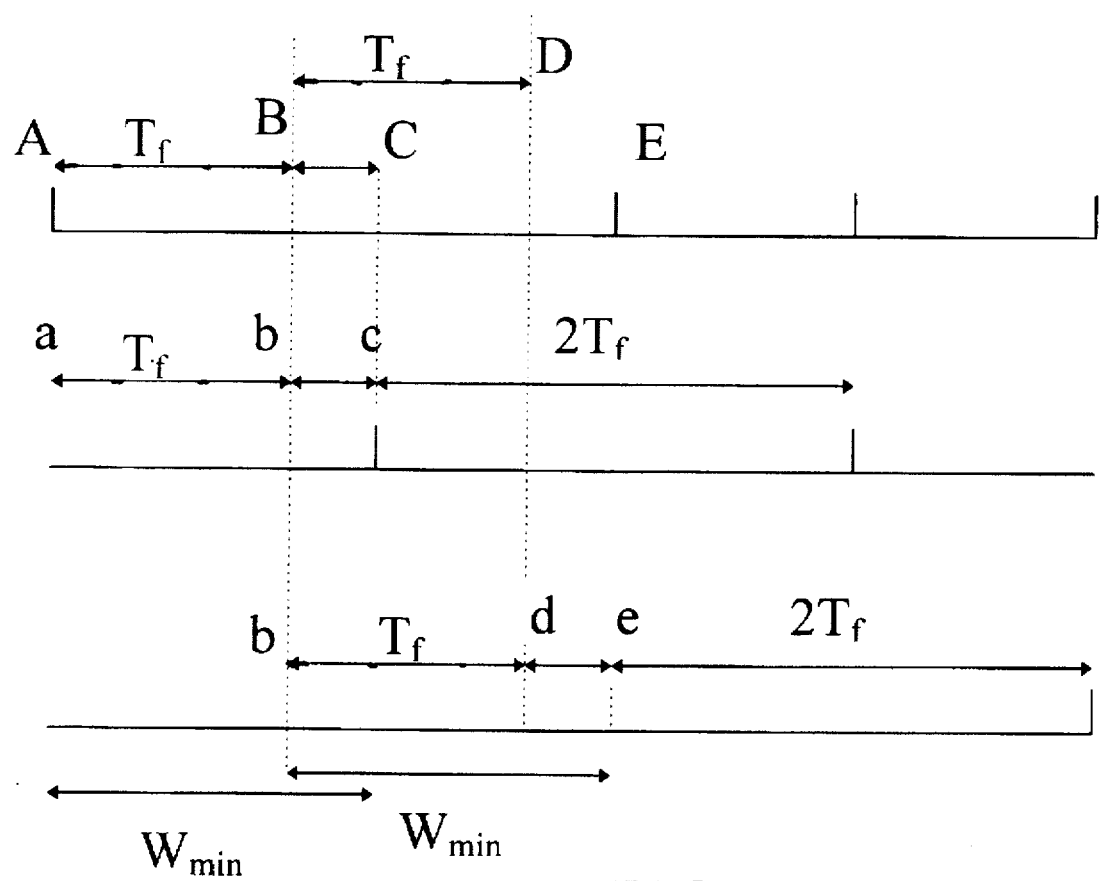

FIG. 8 Waiting time for sources with multiple packet generation periods using the reference times of the packets and reference interval T.

DESCRIPTION OF THE PREFERRED EMBODIMENTS

Modeling the Traffic as Noncontinuous Periodic

Figure 1:
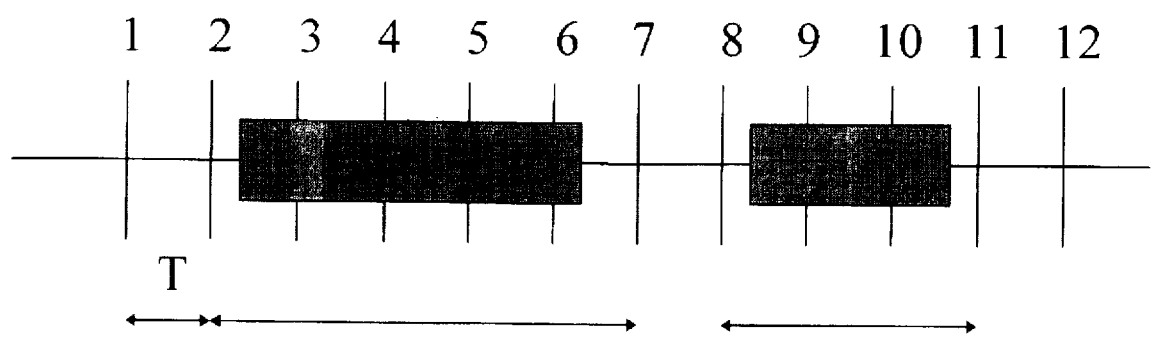
FIG. 1 Representing the traffic as noncontinuous periodic.

In FIG. 1, a graphical representation of a voice traffic being modeled as noncontinuous periodic is displayed. The shaded regions represent talkspurt intervals. Voice packets are generated at the sender exactly at the points indicated in the graph with the vertical lines. This means that a voice packet which is at the front or at the end of a talkspurt interval may only be partially filled with voice data. This modeling of the voice traffic wastes on the average one voice packet per talkspurt interval, but it has many advantages related to multimedia synchronization that will become obvious as we go along. In addition, a sequence number representing the sequence number of the time period the packet was generated at the sender will be attached to the packet. As a result, the packet generated at the time period (slot) between the vertical lines 2 and 3 will be assigned the sequence number 2, the second number 3, and the sixth the number 8 since a silent interval of one period intervenes. The ordered set of the sequence numbers of all the arrived packets will be denoted as $\mathcal{H}$ and the elements will be ordered in sequence from small to high according to their values. This implies that in a situation where a packet arrived out of sequence, the entry in the set $\mathcal{H}$ will be corrected according to the ordering rule.

The video traffic can also be viewed as periodic when the requirement that a video frame (packet) will only be generated at the beginning of a period holds.

Definitions of the Network Jitter and Reference Times

Figure 2:
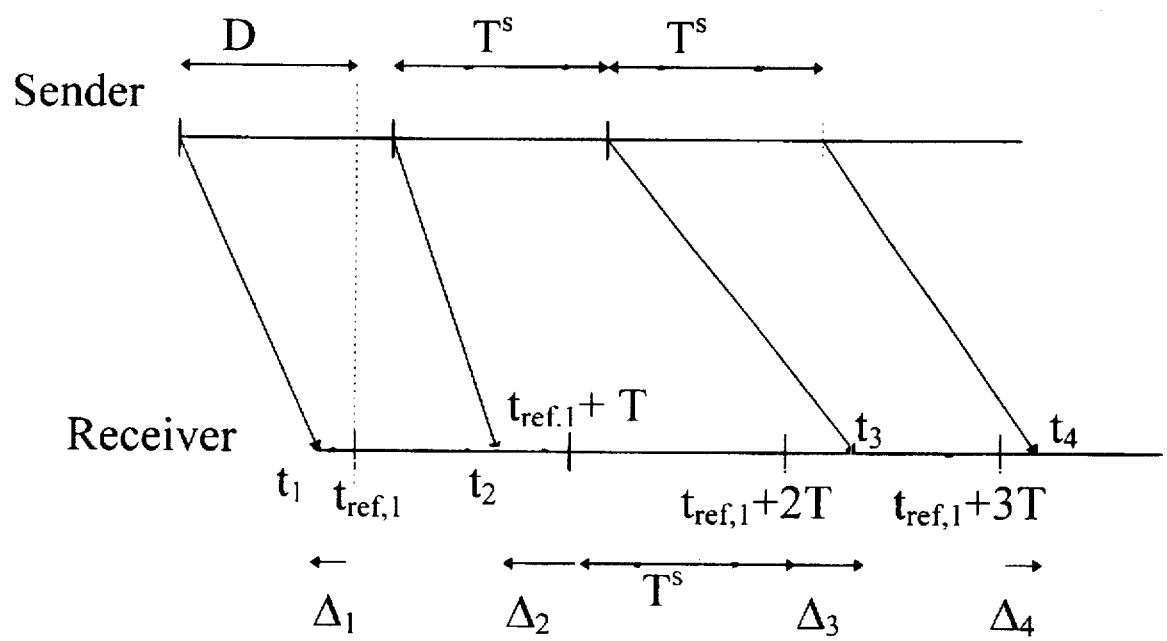
FIG. 2 Definition of the network jitter.

As shown in FIG. 2, the sender periodically transmits packets with nominal period T. However, due to frequency mismatches between the clock at the sender and the clock at the receiver, the actual transmission period of the sender as seen with the receiver's clock will be $T^S$. The average delay time packets experience to arrive at the receiver from the sender is denoted as D. If there were no variation in the delay and each packet were experiencing a constant delay D, then packets would be arriving at points indicated in the graph as $t_{ref,n}$. These points are called the reference times and they satisfy the following condition $$\lim_{N\to\infty} \frac{1}{N} \sum_{n=1}^{\infty} (t_n - t_{ref,n}) \to 0. \tag{1}$$

If the exact location of the arrival time of one packet, let us say packet $n_1$, which experienced exactly the average delay D could be found, then the reference time of any other packet $n_2$ is given by the following expression $$t_{ref,n_2} = t_{ref,n_1} + (n_2 - n_1)T^S. \tag{2}$$

If the actual packet arrivals are denoted as $t_n$, then the network jitter each packet experiences is defined as the difference of the actual arrival time minus the corresponding reference time $$\Delta_n = t_n - t_{ref,n}. \tag{3}$$

Sender-Receiver Synchronization

As noted previously, the model of the traffic is noncontinuous periodic. This model encompasses also the case of a source generating packets continuously and periodically, and therefore no specific treatment for the latter case will be made. In order for the reference times of the packets arriving from the same source to be estimated, firstly the time X where the time offset contributions of all the packets cancel out needs to be found. Let $\mathcal{H}$ be the set of all the packets arrived at the receiver $\mathcal{H}_E$ be a subset of $\mathcal{H}$ such as $\forall n \in \mathcal{H}_E \Rightarrow t_n \leq X$, and $\mathcal{H}_L$ be the complimentary subset of $\mathcal{H}$ such as $\forall n \in \mathcal{H}_L \Rightarrow t_n > X$. Notice also that if the number of the elements in set $\mathcal{H}_E$ is $N_E$ and the number of the elements of the set $\mathcal{H}_L$ is $N_L$, then their sum equals the total number of the received packets $N_E + N_E = N$. The set $\mathcal{H}$ is a proper subset of the set of integers from 1 to N+k $\mathcal{H} \subset \{1,2,\ldots,N+k\}$, and $\mathcal{H} = \{1,2,\ldots,N\}$ iff k=0. When k=0, this means that there is not an empty time slot, and there have arrived as many packets as time slots of duration T. Then the time X can be determined as follows $$\sum_{(n\in\mathcal{H}_E)} (X - t_n) = \sum_{(n\in\mathcal{H}_L)} (t_n - X) \Rightarrow X = \frac{1}{N} \sum_{(n\in\mathcal{H})} (t_n). \tag{4}$$

The next step is finding which packet arrival time $t_n$ exhibits the minimum (in absolute value) distance to time X. If we name the arrival time for this packet $t_x$, where x is an integer and $\chi \in \mathcal{H}$, then the network jitter this packet has experienced will equal to $$\hat{\Delta}_x = \frac{1}{N} \sum_{(n\in\mathcal{H})} \{t_x + (n-x)T^R - t_n\} - \mathcal{E}, \tag{5}$$

where $\mathcal{H}$ is the time offset acquired in time (X-$t_x$). In case $t_x$ and X coincide, the error in Eq. (5) is approximately zero, while when $X \neq t_x$ the error is given by the following $$(X - t_x)\frac{(T^R - T^s)}{T^R} = -(n_x - x)(T^R - T^s). \tag{6}$$

The last relation in Eq. (6) comes when the time X is represented as a function of the sequence number of the time slot that a packet with arrival time the time X would have attached by the sender. If this hypothetical sequence number is represented as $n_x$ and the maximum and minimum values of the network jitter are denoted as $\Delta_{min}$ and $\Delta_{max}$, then it is easy to see that $$\left(n_X - \left\lceil \frac{\Delta_{min}}{T^R} \right\rceil\right) T^R < X < \left(n_X - \left\lceil \frac{\Delta_{max}}{T^R} \right\rceil\right) T^R \Rightarrow \tag{7}$$

$$n_X = \left\lfloor \frac{X}{T^R} \right\rfloor,$$

since $X \gg \Delta_{min}$ and $X \gg \Delta_{max}$.

With $\hat{\Delta}_x$ available, the reference time of the x'th packet is computed using Eq. (3), i.e. $\hat{t}_{ref,x} = t_x - \hat{\Delta}_x$. Then the reference times of the other packets are obtained as $$\hat{t}_{ref,n} = t_x - \hat{\Delta}_x + (n-x)[T^R + (T^S - T^R)] - (n_x - x)(T^S - T^R) \Rightarrow \hat{t}_{ref,n} = t_x - \hat{\Delta}_x + (n-x)T^R + (n-n_x)(T^S - T^R), (n,x \in \mathcal{H}), (n_x \notin \mathcal{H}, n_x \in N) \tag{8}$$

Using the Chernoff bound, it can be easily shown that the estimation of the reference times can be achieved very fast, within 20 to 50 packets, depending on the accuracy required.

The maximum and minimum bounds of the network jitter are estimated as follows $$\hat{\Delta}_{max} \leq \max_{n\in n} \{\hat{t}_{ref,n}\} + \max_{n\in n} \{n_X, N + k - n_X\} 10^{-\nu} T^R, \tag{9}$$

and $$\hat{\Delta}_{min} \geq \max_{n\in n} \{t_n - \hat{t}_{ref,n}\} - \max_{n\in n} \{n_X, N + k - n_X\} 10^{-\nu} T^R. \tag{10}$$

The second terms in Eqs (9) and (10) are due to the unknown error which appears in Eq. (8). Since the maximum or minimum jitter can occur in any of the received packets, we can bound the error $(n-n_x)(T^S-T^R)$ by considering the worst case situation which is max$\{n_x, N+k-n_x\}$. In the same way we can bound the second factor of the second term, i.e. the factor $|T^S-T^R|$ by assuming that the maximum rate of the time offset that anybody can observe in the network cannot exceed a certain value, i.e. $|T^S-T^R| \leq 10^{-\nu} T^R$, where v is a small integer (3 to 6).

For point-to-point communication considering only one medium, the synchronization function at the receiver should simply be the inverse of the maximum delay. Packets should wait exactly so much time, as much as it is estimated that all packets will give within this waiting time interval. If a packet does not come within this interval, then the packet will be considered lost. Therefore, the waiting time for point-to-point network communication will be $$W = \hat{A}_{max} + \epsilon + (N+k)10^{-\gamma}T^R =$$ (11)

$$\max_{n \in \mathfrak{n}} \{t_n - \hat{t}_{ref,n}\} + \epsilon + [\max\{n_X, N+k-n_X\} + (N+k)]10^{-\gamma}T^R$$

Sequence Numbering/Identification at the Receiver

Figure 3:
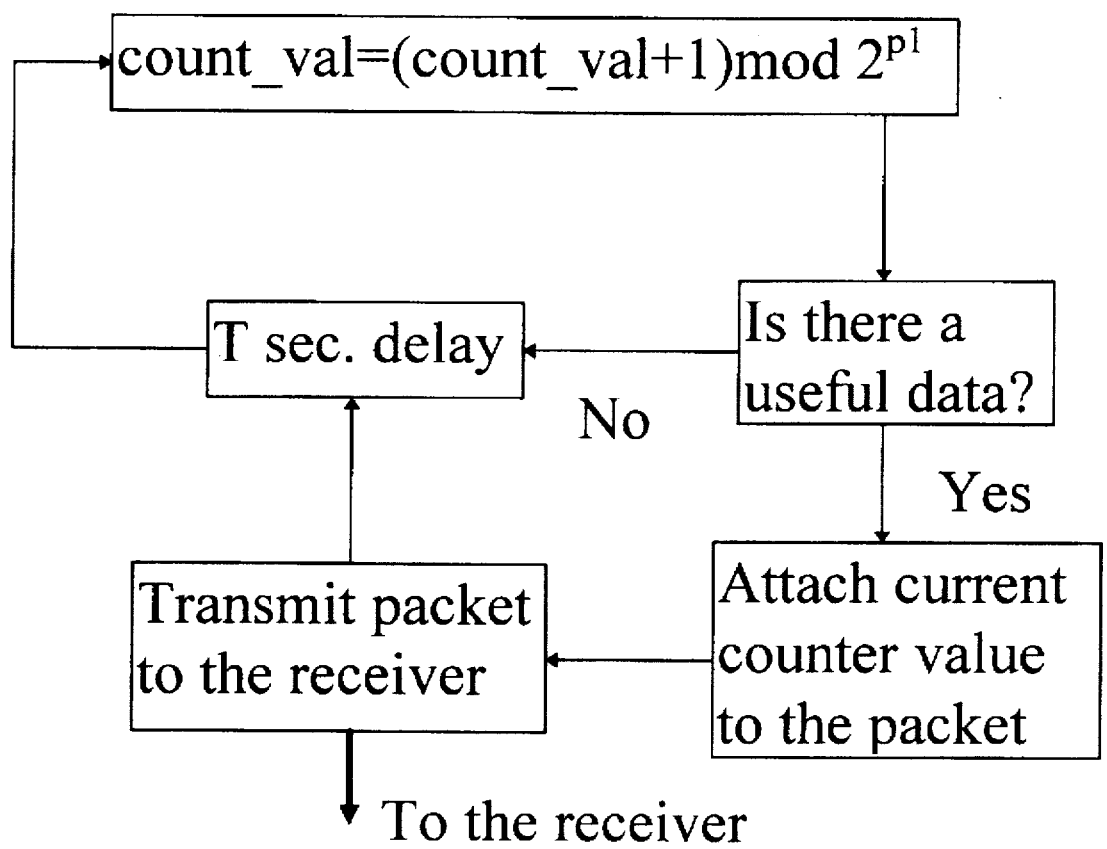
FIG. 3 Sequence numbering and transmission of packets at the sender.

Synchronization between sender and receiver is achieved with the transmission of a $p_1$-bit sequence number. At the sender site, as shown in FIG. 3, every time interval T a counter increments its value and executes modulo $2^{p_1}$. The result is the $p_1$-bit sequence number for this time interval. If there is a useful data to be sent through the network, then these $p_1$ bits are sent over the network along with the packet. If there is no useful data to be sent, i.e. the sender is on a silence time interval, the counter is simply incremented and then executes modulo $2^{p_1}$. The above procedure is repeated till the end of the conference.

Upon the reception of the packet, there are two processes that proceed in parallel by the receiver. The first process involves the post-processing of the arrival times of the packets. By exploiting the information of the arrival times of the packets alone, the receiver is able to determine the bounds of the network jitter, the expected average arrival time of the packets (the reference times), and the frequency offset between its clock and the clock at the sender. An additional advantage of this method is that the sender is not required to transmit the generation time of the packet (time stamp) in order for the frequency offset to be determined by the receiver.

The second process is directly involved with the synchronization of the arrived packet by determining its correct playback time. In order for the second process to operate properly, the reference times, bounds of the network jitter, and frequency offset must be known to the receiver by the first process. Because all of the above parameters need a certain number of pre-received packets, it is assumed that during the connection-setup time a few packets, let us say N, were sent prior to the execution of the synchronization method/apparatus. With their help, a rough estimation of the of the last packet sent during the setup time $t_{ref,O}$ is made. These N packets sent by the sender carried among other useful information their own sequence numbers explicitly into their user field. This implies that the mapping $t_n, \epsilon n$ between the packet arrival times and the sequence numbers already exists for these N packets, and therefore the receiver using Equations (3), and (5) can find the reference time of the last packet N $t_{ref,N}$, which from now on we will call it $t_{ref,O}$ for convenience.

The actions of the two processes at the receiver are as follows. In order for the second process to determine the sequence number of each arriving packet, the reference time of this packet must be known to the second process. However, in order for the first process to estimate the reference time of the arriving packet, the first process must have knowledge of the sequence number of the arriving packet. This is achieved with a feedback loop from the second process to the first.

There are two counters at the receiver: one infinite counter whose value starts incrementing every T seconds right after the end of the setup time $t_{ref,O}$, and a finite counter whose value is repeated after a pre-determined number $2^{p_1}$. In other words, current=(previous+1)mod $2^{p_1}$. The determination of the correct phase of the finite counter will be shown now. There is a $p_1$-bit sequence number associated with every packet which was attached to it by the sender during its departure. This same $p_1$-bit sequence number will be used to denote the arrival time of each packet at the receiver as long as the packet has experienced exactly the average delay. In other words, if the reference time of a packet n could be known to the receiver, then the reference time, and along with it the time interval $[t_{ref,n}, t_{ref,n}+T]$, will be assigned the $p_1$-bit sequence number this packet n carries with it. Then, since the network jitter the x'th packet experiences can be estimated using Equation (5), the receiver can determine the $p_1$-bit sequence number of the reference time of the x'th packet as follows (:=is the assignment operator)

$$(t_{ref,x})_{p_1} := (x)_{p_1}.$$ (12)

$(x)p_1$, is the $p_1$-bit sequence number attached to packet x at the sender. Then the $p_1$-bit sequence number of the following k'th interval away from $t_{ref,n}$, i.e. the interval $[t_{ref,x}+kT, t_{ref,x}+(k+1)T]$, can be determined by the following operation $$(t_{ref,x+k})_{p_1} = \{(t_{ref,x})_{p_1} + k\} \mod 2^{p_1}.$$ (13)

Once the reference times are mapped into $p_1$-bit sequence numbers, the $p_1$-bit sequence number of the current reference interval is compared with the $p_1$-bit sequence number of the packet that arrived within this time interval and needs to be synchronized. Synchronization now translates into a problem of finding the correct mapping between the arriving packet and its reference time. The reference time of the arriving packet is the beginning of the nearest interval T whose $p_1$-bit sequence number agrees with the $p_1$-bit sequence number of the arriving packet. The number δ of intervals T the reference time of the arrived packet is away from the beginning of the current interval is given by the following statement.

Statement 1.

Suppose an entire axis is divided into equally spaced intervals T. Each interval T is represented by a $p_1$-bit sequence number, such that the sequence number of the next interval is related to the previous by the following relation: next =(previous+1)mod $2^{p_1}$. A packet which carries an arbitrary $p_1$-bit sequence number falls into an arbitrary interval T. Given the $p_1$-bit sequence numbers of the packet $A=A_{p_1}, A_{p_{1-1}} \ldots A_1$ and that of the interval T $B=B_{p_1}B_{p_1-1} \ldots B_2B_1$ which fell into, then the nearest interval T whose $p_1$-bit sequence number $C=C_{p_1}C_{p_{1-1}} \ldots C_2C_1$ exactly matches the $p_1$-bit sequence number of the packet is located δ intervals away (ahead−, behind+) from the current interval. δ satisfies the condition A=(B+δ)mod $2^{p_1}$=C and is given by the following relation $$\delta = \sum_{i=1}^{p_1} (\bar{A_i}B_i - A_i\bar{B_i})2^{i-1}$$ (14)

The proof of Eq. (14) can be easily determined by the truth tables of $\overline{A}B - A\overline{B}$. Once δ is found, the proper time that the arrived packet should be played back is determined as follows $$\text{playback}_{time}(n) = \hat{t}_{ref,n} + W = (\text{current}_{ref-time} + \delta T) + W,$$ (15)

where current$_{ref-time}$ is the beginning of the interval the arrived packet fell into. The meaning of Eq. (15) is that the playback time of the packet is W seconds after its estimated reference time, or δT+W seconds after the beginning of the reference interval the packet fall into. To clarify the involved implementation, an example follows.

EXAMPLE

Figure 4:
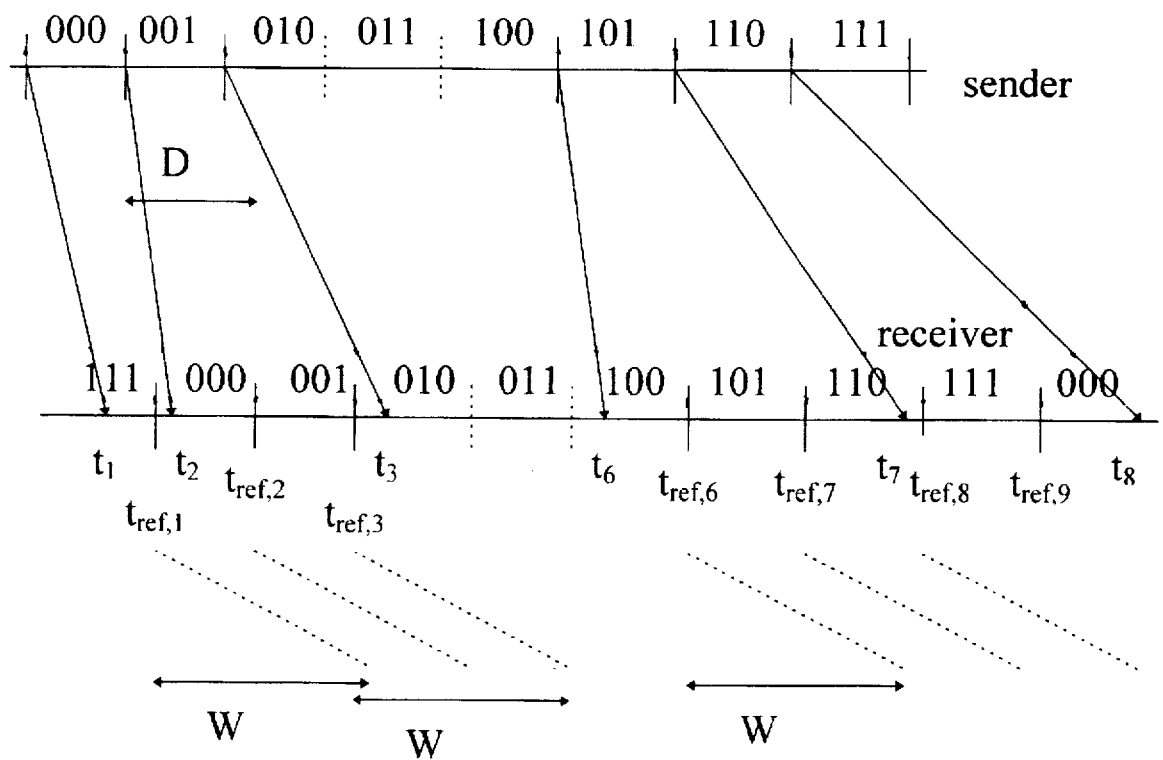
FIG. 4 Example of a typical interaction between sender and receiver for synchronization.

In the example shown in FIG. 4, let us have T=6 ms, $p_1$=3, and the maximum jitter from the average observed in the network $\hat{\Delta}_{max}$ is 12 ms. Allowing 2.5 ms for the estimation error and the uncertainty in the time offset, the waiting time from the reference time becomes W=14.5 ms. If the current 3-bit sequence number of the reference time at the receiver shows 100 and during this time slot a packet arrived with 3-bit sequence number 101, then using Equation (14), $A_3A_2A_1$=101, $B_3B_2B_1$=100, and $\delta=(\overline{1}1-1\overline{1})\ 2^2+(\overline{0}0-0\overline{0})\ 2^1+(\overline{1}0-1\overline{0})2^0=-1$. This makes the reference time of the arriving packet one time slot into the future from the beginning of the current interval. It follows that the playback time is simply W=14.5 ms away into the future from the reference time of the packet $\hat{t}_{ref,6}$.

Interparticipant Synchronization

Summary of the Synchronization Method

Here, the maximum error allowable in the synchronization of packets from different sources will be designated $\mathcal{E}_T$. As it will be shown later, the error $\mathcal{E}_T$ will be composed from two components: one error component due to the finite number of packets used to estimate the reference times $\mathcal{E}_R$, and another due to the time offset acquired in the time interval NT ($\mathcal{E}_F$) The total error will be designed in such a way so that it satisfies the packet loss criteria of the designer of the real-time application. For instance, the total error might be designed in such a way that the packet loss is strictly less than one packet out of 1000 or 10,000 received. Summary of the synchronization method is provided now.

Main Method

The steps below are executed every new N packets received from each source i. Synchronization is shown to be achieved for the next N received packets.

1. Determine the reference time and maximum value of the network jitter ($\hat{\Delta}^i_{max}$) for each source i.
2. a. Divide time at the receiver in equally spaced intervals of duration T. These intervals are named the reference intervals, and packets whose reference times fall into the same reference interval belong to the same set.
   b. In case the time window that is used is T $$T - \frac{T}{2^{M-1}},$$

a slight modification is required. We still divide time at the receiver in equally spaced intervals of duration T. At the beginning (or at the end) of these intervals, we reserve a time window of length T $$T - \frac{T}{2^{M-1}}.$$

This is now the reference interval, and packets whose reference times fall into the same reference interval belong to the same set.

3. Determine the additional time delay after the end of the current reference interval that the receiver has to wait in order to receive one packet from each source, i.e. to receive all packets belonging to the current set. This delay time for each set is the time measured from the end of its reference interval to its playback time.
4. Group the packets according to their reference times. Wait for the time interval found in step 3 and then play them back together.

Feedback

Feedback can be employed both before or after the estimation of the frequency offsets between the clocks at the sources and the clock at the receiver. Employing feedback reduces the waiting/delay time that each packet experiences to the minimum. The basic steps of the feedback method/apparatus are:

1. Determine the distance in time that the reference time of each source i is away from a point M (we chose it to be the middle of the reference interval with duration T, but any other point will do) and send this information back to each source i.
2. Upon reception of the feedback packet, the source i either pauses time $d^i$ or inserts noisy data of time duration $d^i$ in the first packet depending on whether its clock is faster or slower than the clock at the receiver.

During the conference setup time, we may allow the error to be larger than $\mathcal{E}$. By allowing a larger error, the number of packets N needed for a certain level of accuracy is decreased geometrically. However, if a need to compute the reference times fast is needed, we may even allow feedback packets that will permits us faster accuracy of the reference times.

Minimum Waiting Time for Playback

The minimum time window required for the reception of one packet from each source (i.e. 1 packet from source 1, 1 packet from source 2, . . . . , and 1 packet from source M) generating packets with period T in the absence of network jitter is T. This is due to the phase differences among the sources. Using induction, we van show that the smallest time window during which all M sources are guaranteed to generate packets is $$T - \frac{T}{2^{M-1}}.$$

However, in practice due to the frequency drifts of the clocks, we will see that this minimum time window requires constant movement at the receiver which is not desired because of complexity in implementing the method. Here is the usefulness of the reference time which is relatively immune to the network jitter and therefore indicates with high probability of confidence whether a packet received belongs to the set whose reference time is within a time window or not. Packets with reference times belonging to the same time window T will be assigned to the same group when played back at the receiver. In contrast to the reference time, actual packet arrival time varies due to the network jitter. A packet from source i with its reference time at the end of the time window T and having maximum jitter $\Delta^i_{max}$ might arrive as late as $T+\Delta^i_{max}$. The total delay time to receive one packet from each source can be shown to be $$D^i + x^i \max_i \{\hat{\Delta}^i_{max}\} + \epsilon_R + N \max\{|T^p - T^R|\}, 1 \leq i \leq M \tag{16}$$

$D^i$ is the average time delay for a packet to arrive from source i to the receiver. $x^i$ is the length in time that the reference time of source i is away from the late edge in the time window T. The fifth term is due to the maximum time offset we expect from the different clocks at a particular situation. Since the worst case situation is to have the reference time to be at the early edge of the reference interval, then the $$\max_{i} \{x^i\} = T$$

is the reference interval, and the minimum waiting time is $$W_{min} = T + \max_{i} \{\hat{\Delta}^i_{max}\} + \epsilon_R + N \max_{s} \{|T^s - T^R|\}, 1 \leq i \leq M \quad (17)$$

Figure 5:
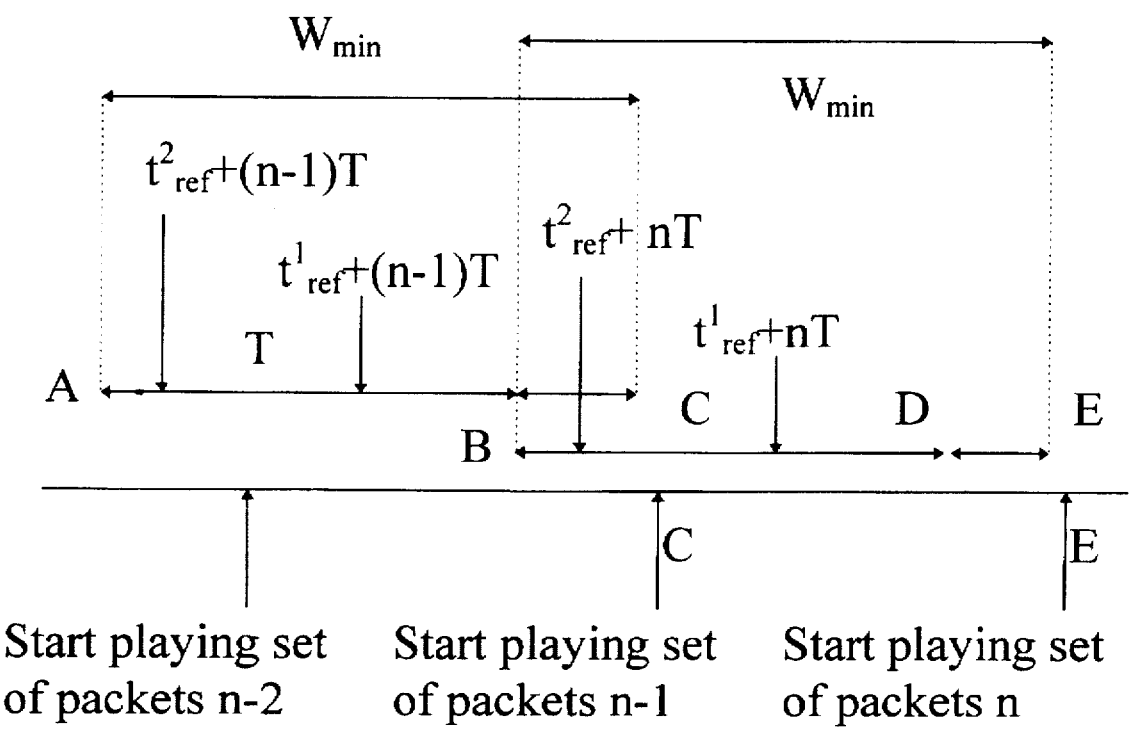
FIG. 5 Waiting time for playback using the reference times and reference interval T.

As shown in FIG. 5, the minimum waiting time consists of two intervals. Interval AB(=T) and interval BC. Interval AB is due to the phase offset and is the interval which often will be referred to as the reference interval, and interval BC is function of both the network variation in the delay and the frequency differences of the clocks between sender and receiver. Note that interval BC overlaps with the next interval BD. A packet whose reference time is in interval AB and arrives at interval BC will be played back at time C. However, a packet whose reference time is in interval BD and arrives at interval BC will be played back at time E.

An improvement to the apparatus/method is as follows. To each reference time $t_{ref,n}^i$, we add its maximum value of the jitter observed in its connection $\hat{\Delta}^i_{max}$, plus $$\epsilon_T = \epsilon_R + N \max_{i} \{|T^s - T^R|\}.$$

If each connection were considered as a point-to-point connection, these points would be the individual playback times of the packets for this connection (source i). Let us call those points the individual playback points or times for the connection for source i, $t_{pb,n}^i$. Then, the following relation is valid:

$$\hat{t}_{pb,n}^i = \hat{t}_{ref,n}^i + \hat{\Delta}^i_{max} + \mathcal{E}_T. \quad (18)$$

(In the remaining of the paper, we might use interchangeably the terms individual playback times or playback times. Most of the time we will be using the term playback times, and if there is a need to distinguish with the playback time of all the packets in a fusion set, we will use the term individual playback times.)

With the same analysis as with the reference times, we are guaranteed that in a time window T, we will be receiving one packet from each source whose "playback" time $\hat{t}_{pb,n}^i$ will be within this time window T. Of course, as noted also above, the smallest time window is smaller $$\left( T - \frac{T}{2^{M-1}} \right),$$

where M is the total number of participants. But neglecting this for the moment, the total delay time for playback for packets from source i at the receiver will be $$D^i + y^i + \hat{\Delta}^i_{max} + \epsilon_R + N \max_{s} \{|T^s - T^R|\}, 1 \leq i \leq M \quad (19)$$

and $y^i$ is the length in time that the playback time of source i is away from the late edge in the time window T. The $y^i$'s are not the same as the $x^i$'s, but their average value will be the same. Because the probability distribution of the $y^i$'s and the $x^i$'s are the same, since the $y^i$'s are a shifted version of the $x^i$'s by $\hat{\Delta}^i_{max} + \mathcal{E}_T$. We see now that there is an average improvement in the waiting time for each source equal to the difference of $$\max_{i} \{\hat{\Delta}^i_{max}\} - \hat{\Delta}^i_{max}.$$

There will also be one more improvement. If the reference time of a packet from a particular source is very close at the early edge of the time window T, then it might happen that this improvement $$\max_{i} \{\hat{\Delta}^i_{max}\} - \hat{\Delta}^i_{max} = G$$

might make its playback time now to belong to an earlier set (Fusion set) for playback. In that case, the gain in time for the waiting time for this source will be the length of the time window, T. The probability that this will happen is $G/T$, and therefore the total improvement (on the average) will be $$G_T = \frac{G}{T}(T+G) + \frac{1-G}{T} G. \quad (20)$$

We would like also to note here, that even for the case that the source k has the maximum observable jitter in the observable time interval NT of all the sources, i.e.

$$\max_{i} \{\hat{\Delta}^i_{max}\} = \hat{\Delta}^k_{max},$$

the improvement $$\max_{i} \{\hat{\Delta}^i_{max}\} - \hat{\Delta}^i_{max}$$

will still be valid on the average.

The second improvement has to do with taking into account the minimum theoretical time window that we are guaranteed to receive the reference times or the playback times of the packets. The improvements in the waiting times of the packets, especially for two (2) or three (3) sources, will be $$\frac{T}{2} \text{ and } \frac{T}{4} \text{ respectively, since } T - \frac{T}{2^{2-1}} = \frac{T}{2},$$

and $$T - \frac{T}{2^{3-1}} = 3\frac{T}{4}.$$

The description of how can this be achieved, keeping in mind that the reference times time (during the time (during the time interval NT that the interparticipant method is re-executed), follows. Our method has an error in estimating the reference times of the packets, $\mathcal{E}_R$, and an error due to the frequency offsets between the clocks at the sources and the clock at the receiver. Unless we have a mechanism to estimate the frequency offsets among the clocks, we have to assume the maximum possible difference, i.e.

$$\max_i \{|T^S_i - T^R_i|\}.$$

The time window that we are guaranteed that one of the reference or playback times from each source is within this time interval is $$T - \frac{T}{2^{M-1}}.$$

Figure 6:
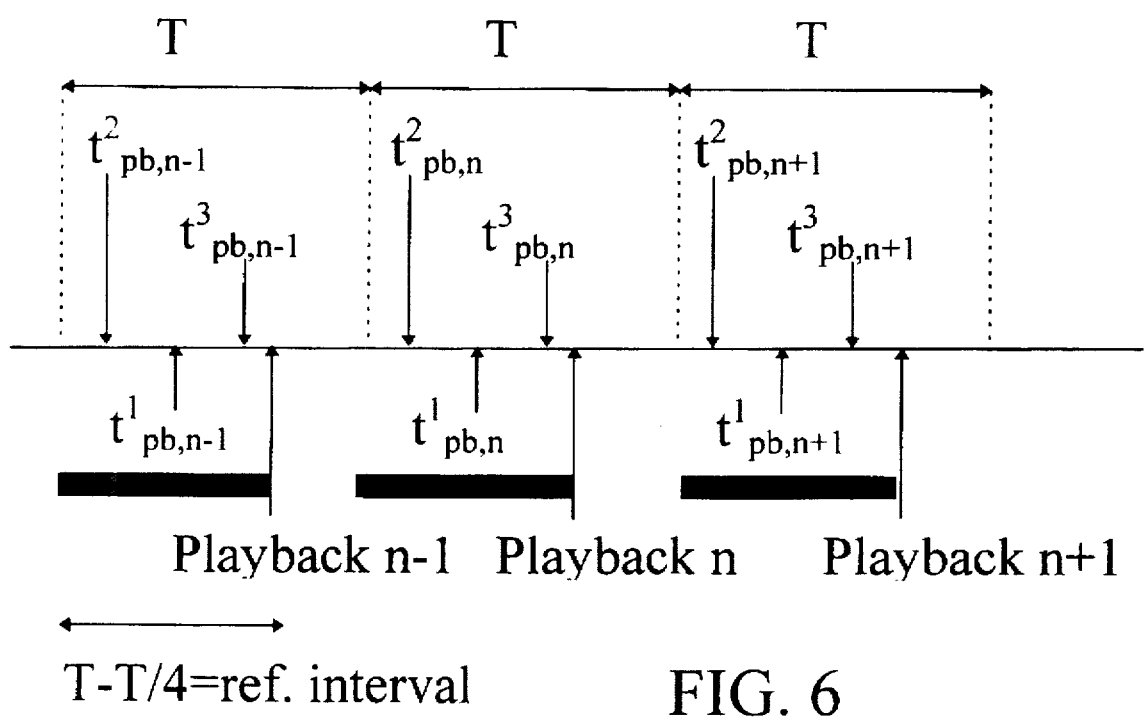
FIG. 6 Waiting time for playback using the individual playback times of the sources and reference interval the minimum theoretical interval $$T - \frac{T}{2^{M-1}},$$

Then, the total delay time for packet from source i, in case we are using the playback times (see FIG. 6), is $$D^i + z^i + \hat{\Delta}_{max}^i + \epsilon_T, \quad 1 \leq i \leq M \tag{21}$$

The $z^i$ is the length in time that the playback time of source i is away from the late edge in the time window $$T - \frac{T}{2^{M-1}}.$$

The following relation holds between the average values of the $z^i$'s and the $$y^i\text{'s: } \bar{z}^i = \bar{y}^i - \frac{T}{2^{M-1}}.$$

The total delay time for packet from source i, in case we are using the reference times is $$D^i + w^i + \max_i \{\hat{\Delta}_{max}^i\} + \epsilon_T, \quad 1 \leq i \leq M \tag{22}$$

The $w^i$ is the length in time that the reference time of source i is away from the late edge in the time window $$T - \frac{T}{2^{M-1}}.$$

The following relation holds between the average values of the $w^i$'s and the $$x^i\text{'s: } \bar{w}^i = \bar{x}^i - \frac{T}{2^{M-1}}.$$

When the time window is $$T - \frac{T}{2^{M-1}},$$

in either case (reference or playback times), the start of the time window needs to be moved when the synchronization method is executed (time interval NT). To find the new starting point of the time window, we take the following steps.

1. We find the average time delay and the maximum time delay for each source, $\bar{D}^i$ and $\overline{D^i + \hat{\Delta}_{max}^i}$.
2. For each of the reference/playback times of the sources, we repeat steps 3,4, and 5.
3. We take as the end of the time window the reference/ playback time of this source.
4. We subtract time $$T - \frac{T}{2^{M-1}}$$

from the reference/playback time. This takes us to the beginning of the time window.

5. We check to see if one reference/playback time from each source is within this time window. If this is true, we note down the source. This is the source that we took it to be the end of the time window (or the late edge).
6. From all the sources that their reference/playback times satisfy the condition to be the late edge of the time window, we take this source with the largest average time delay for the case of the reference times, and the source with the maximum time delay for the case of the playback times.

By executing step 6 above, we sort of equalizing the time delays. Because the source with the maximum time delay gets to be at the late edge of the time window, and therefore it does not wait any other extra time in order to be played back.

Feedback

It is obvious that the time delay obtained with Eqs (16), (19), (21) and (22) is not the optimum. A source i with reference time at the beginning of the reference interval T (or $$T - \frac{T}{2^{M-1}} \text{ )}$$

will be delayed an additional time $$\left( \text{or } T - \frac{T}{2^{M-1}} \right)$$

in order for the packets from source i to be played back. Since the length of the reference interval can be as large as one or two times the maximum jitter experienced in the network, quality of service will be degraded due to excessive delay. While the terms in the equation with the waiting time which have to do with the maximum jitter and the error cannot be minimized further, the term related to the reference interval (x, or y, or z, or w) can be minimized if feedback is employed. As a reminder, this term (x, or y, or z, or w) has to do with the phase offsets existing among the different participants of a conference. We will distinguish two cases depending on whether an estimation of the rate of the time offset is available. One case when there is no estimation of the frequency offsets, and another case when estimations of the frequency offsets exist.

Since the estimation of the reference times is performed every NT seconds, a feedback packet from the receiver to source i need to be sent every NT seconds. There will be a delay from the moment the feedback packet is sent to the moment it arrives at the source and takes effect. The packets that arrive at the receiver during this delay cannot be used towards the estimation of the next reference time.

Feedback when no estimation of the frequency offsets exist

During this period of time, we do not have an estimation of the rates of the time offsets and it is impossible to predict the exact time offsets acquired during the time interval NT between the clock at the receiver and the clock at the sender. Nevertheless, as we have done in Eqs (16), (19), (21), and (22), we assume that in a time interval NT the maximum possible time offset two clocks in the network can experience is $N(T^S-T^R)$. s is the imaginary source which gives the maximum frequency drift measured against the receiver clock. To compare the reference times of the different sources, we arbitrarily choose to measure their time distances from the midpoint M of their current reference interval. Thus, when the reference times are estimated, their distances $d^i$ to point M will be computed as well. A distance will be called positive when the reference time of the source is at the left to the point M, and negative when it is at the right. If the feedback packet carries the value $d^i$ to each source i, and the source i readjusts itself properly, the reference time for source i for the next NT seconds will be very close to point M, and actually will be within the interval $[M-|N(T^S-T^R)|,M+|N(T^S-T^R)|]$. Source i will either pause time $d^i$ if $d^i$ is positive, or precede the following data of time duration $(T-d^i)$ with noisy data of duration $d^i$, if $d^i$ is negative. The total delay time for packets from source i will now be $$\bar{D}^i + x_F^i + \max_i \{\hat{\Delta}^i_{max}\} + \epsilon_R, 1 \leq i \leq M. \quad (23)$$

$x_F^i$ is the length in time that the reference time of source i is away from the late edge of the time window $[M-|N(T^S-T^R)|,M+|N(T^S-T^R)|]=2|N(T^S-T^R)|$. In other words, feedback has reduced the length of the reference interval from T to $2|N(T^S-T^R)|$.

In case the variation of the main method with the individual playback times is used, the total delay time for packets from source i will be $$\bar{D}^i + y_F^i + \max_i \{\hat{\Delta}^i_{max}\} + \epsilon_R, 1 \leq i \leq M. \quad (24)$$

$y_F^i$ is the length in time that the playback time of source i is away from the late edge of the time window $[M-|N(T^S-T^R)|,M+|N(T^S-T^R)|]=2|N(T^S-T^R)|$. M is now the middle point of the reference interval which is constructed with the playback times of the packets. In the case that the reference interval is $$T - \frac{T}{2^{M-1}}$$

and feedback is applied, we get no better results than the ones shown in Eqs (23) and (24).

Feedback When Estimation of the Frequency Offsets are Available

Let us assume that accurate estimates of the rates of the time offsets between the clocks at the sources and the clock at the receiver are obtained. Let us assume that the size of the maximum rate of the time offset occurs for source. In NT seconds, this will lead to a maximum time offset. Let $d^i$ be the distance of the reference time for source j to the midpoint M of the reference interval. The feedback packet brings this information to source j and source j readjusts itself so that its new reference time is at point M. After time NT the reference time for source j will move to new point, point Z. We have $|M-Z|=|N(T^j-T^R)|=|T^j_{off}|$. Point Z will be to the left of point M if the time offset is negative, i.e. the clock at the source j is slower than the clock at the receiver, and to the right of point M if it is positive, i.e. the clock at the source j is faster than the clock at the receiver. Without loss of generality, let us assume that the clock for source j is faster is faster than that of the receiver and consequently point Z will be at the right of point M as shown in FIG. 7. Then we compute the distances for the rest of the sources as follows: a) for the sources with positive time offsets (source 1 in FIG. 7), the distances will be computed from their reference times to point M. b) for the sources with negative time offsets (source 2 in FIG. 7), the distances will be computed from their reference times to point Z. The distances defined in this way will be sent back with the feedback packets to the corresponding source, i.e. distance $d^i$ to source i. When the sources receive the feedback packets, they will readjust the generation times of the packets so that their respective reference times (or playback times) to coincide with either point M or point Z at the receiver. Since we have used the maximum possible clock offset of any of the sources, the reference times are guaranteed to be within the interval [M,Z] during the next time interval NT. The total delay time for packets from source i will now be $$\bar{D}^i + u^i + \max_i \{\hat{\Delta}^i_{max}\} + \epsilon_R, 1 \leq i \leq M, \quad (25)$$

when the main method with the reference times is used, and $$\bar{D}^i + u^i + \hat{\Delta}^i_{max} + \mathcal{E}_R, 1 \leq i \leq M, \quad (26)$$

when the main method with the individual playback times is used. $u_i$ is the length in time that the reference/playback time of source i is away from the late edge of the time window $|N(T^j-T^R)|$.

The same procedure can also be used when the signs of the frequency offsets with respect to the clock at the receiver are known, although not the actual frequency offsets. The only difference will be that the point Z will be computed from point M by subtracting the maximum frequency offset that we pre-assumed for the network. For example, we might say that no clock of a source in the network may exhibit a frequency offset with any other clock by more than $10^{-3}T$. Then, instead of the term $T^j-T^R$ we will use this term $10^{-3}T$, and point Z will be found by subtracting time interval equal to $N10^{-3}T$.

Minimum waiting time for sources with different periods

Here we modify the minimum waiting time that will permit the use of sources transmitting packets with different periods. The periods are assumed to be integer multiples of the shortest packet generation period $T_f$. The subset of sources transmitting packets with period $T_f$ will be referred to as the fundamental subset f. The total delay time for packets from source i for playback will be $$\bar{D}^i + x^i + \max_i \{\hat{\Delta}^i_{max}\} + \epsilon_R + \epsilon_F, 1 \leq i \leq M. \quad (27)$$

$x^i$ is the length in time that the reference time of source i is away from the late edge of the time window $T_f$. The worst case (i.e. the maximum value $x^i$ can have is $T_f$), and therefore the minimum waiting time will be $$W_{min} = T_f + \max_i \{\hat{\Delta}^i_{max}\} + \epsilon_R + \epsilon_F, 1 \leq i \leq M. \quad (28)$$

The validity of Eq. (28) is deduced from the following syllogism. It is clear that in the absence of other sources with multiple packet generation periods, Eq. (28) holds at least for subset f. The reference time of a source with larger packet generation period, let us say $nT_f$, has to fall within one interval $T_f$ of subset f. The next packet is not expected to arrive until a time interval $nT_f$ has elapsed. Consider for each reference interval $T_f$ all the sources that their reference times fall into. With the exception of the range i, which will have to be a member only from the sources with reference times within this interval, the minimum waiting time will be as defined in Eq. (28). By repeating the above until all sources have been exhausted, a different source i can be found for different reference intervals. Different i will cause a problem when the reference time of a source falls into another reference interval and this is the reason for considering i to be any source in Eq. (28).

The first line in FIG. 8 shows sources with period $T_f$, while in the two lines below that, there are sources with periods $2T_f$. So sources with period $2T_f$ and reference times falling within time interval [a,b] are played back at time c(=C). If their reference times fall within time interval [b,d], they are played back at time e(=E).

The same improvements that were discussed for the case of sources generating packets with only one nominal period are also valid for the case of sources generating packets with periods that are integer multiple of a fundamental period $T_f$. The first improvement where the playback times are used instead of the reference times is clearly valid. The total delay time for playback for packets from each source i is $$\overline{D^i} + y^i + \hat{\Delta}_{max}^i + \mathcal{E}_R + \mathcal{E}_P, \quad 1 \leq i \leq M \qquad (29)$$

where $y^i$ is the length in time that the playback time of source i is away from the late edge of the time window $T_f$. $T_f$ is the time window that guarantees us that the playback time of source i of the subset f will be within this interval, plus for any other source's playback time with multiple generation period $(nT_f)t_{pb}^j$, one of the following times is within this time interval $T_f$: $t_{pb}^j$, $t_{pb}^j - T_f$, $t_{pb}^j - 2T_f$, ..., $t_{pb}^j - (n-1)T_f$, where j is any source with multiple generation period.

The second improvement deals with the minimization of the reference interval, which for this case will be $$T_f - \frac{T_f}{2^{M-1}},$$

where M is the number of al the sources. (Note: we cannot use $M_n$, where $M_n$ is the number of sources that their playback times fall into time interval $$T_f - \frac{T_f}{2^{M-1}},$$

because we will end up with waiting times different for each period $T_f$). Clearly, for sources with packet generation period $nT_f$, where n>1, we cannot guarantee that their reference or playback times will be within a time interval $$T_f - \frac{T_f}{2^{M-1}}.$$

However, what we really mean for the packets of these sources is that one of the following times, $t_{pb}^j, t_{pb}^j - T_f t_{pb}^j - 2T_f, \ldots, t_{pb}^j - (n-1)T_f$, is within the time window $$T_f - \frac{T_f}{2^{M-1}}.$$

is any source with multiple generation period.

The total delay time for packets of each source in the case the reference times are used is as follows $$\overline{D^i} + w^i + \max_i \{\hat{\Delta}_{max}^i\} + \epsilon_R + \epsilon_F, \quad 1 \leq i \leq M \qquad (30)$$

The $w^i$ is the length in time that the reference time of source i (whose reference time is within the time window $$T_f - \frac{T_f}{2^{M-1}})$$

is away from the late edge of the time window $$T_f - \frac{T_f}{2^{M-1}}.$$

The following relation holds between the average values of the $w^i$'s and the $$x^i \text{'s:} \quad \overline{w^i} = \overline{x^i} - \frac{T_f}{2^{M-1}}.$$

The total delay time for packets of each source in the case the playback times are used is as follows $$\overline{D^i} + z^i + \hat{\Delta}_{max}^i + \mathcal{E}_R + \mathcal{E}_P, \quad 1 \leq i \leq M \qquad (31)$$

The $z^i$ is the length in time that the playback time of source i (whose playback time is within the time window $$T_f - \frac{T_f}{2^{M-1}})$$

is away from the late edge of the time window $$T_f - \frac{T_f}{2^{M-1}}.$$

The following relation holds between the average values of the $z^i$'s and the $$y^i \text{'s:} \quad \overline{z^i} = \overline{y^i} - \frac{T_f}{2^{M-1}}.$$

Similarly with the case of a single generation period of the packets for all the sources, for the multiple case too, when the time window for the reference interval used is $$T_f - \frac{T_f}{2^{M-1}},$$

in either case (reference times or playback times), the start of the time window needs to be moved when the synchronization method is executed (time interval NT). To find the new starting point of the time window, we take the same steps as for the case of a single generation period of the packets for all the sources.

The same feedback method used for the case of a single generation period of the packets can also be applied to the case of sources generating packets with multiple periods (with respect to a fundamental).

Determination of the time to change the waiting time of the packets

Anytime the method is re-executed (time interval NT), it is very possible that the waiting time for the packets needs to be changed. If the length of the new waiting time is larger than the currently used waiting time, then the receiver will only need to find a silent interval (for voice packets). Once the silent interval is found, any data after this time interval is played according with the new waiting time.

In case the length of the new waiting time is smaller than the currently used waiting time, then the receiver has to find a silent interval whose length is larger than the difference of the two waiting times.

The Zeta Times

We have concentrated ourselves only on apparatus and methods that use the reference times of the packets or the individual playback times for the determination of the fusion sets of the packets. Here we will generalize the concept of the reference times, and the name for these new times will be the zeta times. Zeta times will be constructed from the reference times of the packets by adding a constant time $X^i$ to each reference time from a common source, but this constant time might be different for different sources. Therefore, the zeta times will be defined as $$t_{z,n}^i = X^i + t_{ref,n}^i. \qquad (32)$$

It is easily seen that the reference times can be derived from the zeta times if for all sources i, $X^i=0$, and the individual playback times can be derived by the zeta times if for each source i, $X^i = \hat{\Delta}_{max}^i + \mathcal{E}_T$, and in this case we can easily see that $t_{z,n}^i = t_{pb,n}^i$.

Zeta times will be very useful because they will enable us to determine the fusion sets of the packets for playback also to network applications that need various time delay constraints. Because there might be applications that require packets from specific source(s) to be delayed a specific amount of delay than from certain other sources. This of course might require the determination of the exact time delays of the packets, but the point is that the same concept, i.e. dividing the time at the receiver into reference intervals, and then the packets that their corresponding zeta times fall within this reference interval belong to the same fusion set for playback.

While the present invention has been described with reference to the details of the embodiments enclosed, these details are not intended to limit the scope of the invention as claimed in the appended claims.

What is claimed is:

1. A method for identifying packets to belong in a fusion set, said packets arriving at a receiver transmitted from different sources in a packet based computer network, the method comprising the steps of:

transmitting said packets from each source to said receiver, and at least one of said sources transmits said packets non-continuously;

estimating zeta times of arriving said packets from each source at said receiver, wherein said zeta time is defined as: $t_{z,n}^i = t_{ref,n}^i + X^i$, wherein $t_{z,n}^i$ is said n'th zeta time from source i, $t_{ref,n}^i$ is n'th expected arrival time of packet from said source i (reference time), and time $X^i$ is a real number which is constant for packets from same said source i;

dividing time at said receiver in reference intervals; and determining said fusion set of said zeta times, said zeta times belonging to same said fusion set also belong to same said reference interval.

2. The method as recited in claim 1 further comprising the step of delaying said packets whose said zeta times belong to same said fusion set a minimum but large enough time to compensate for:

variable transmission delays or jitter among said packets transmitted from same said source, and said packets belonging to same said fusion set to be synchronized among themselves according to requirements of a specific real time network application.

3. The method as recited in claim 1 further comprising the step of reducing said reference interval by sending a feedback packet to each one of said sources, said feedback packet containing information related to position of said zeta time within its corresponding said reference interval.

4. The method as recited in claim 1 wherein said step of transmitting said packets from each source to said receiver further includes said sources transmitting said packets to said receiver periodically, said transmission periods are multiple integer of a fundamental period, said multiple integer includes integer one.

5. The method as recited in claim 1 further comprises the steps of:

attaching a sequence number to said transmitting packet at said source;

denoting each said reference interval at said receiver with a sequence number; and mapping said sequence numbers of said reference intervals with said sequence numbers of said transmitting packets, said zeta time of said packet whose said sequence number mapped with said sequence number of said reference interval is within said mapped reference interval.

6. The method as recited in claim 1 wherein said step of estimating said zeta time further comprises the step of estimating time delays from each of said sources to said receiver, said time delays are used to determine said times $X^i$ for each said source i.

7. The method as recited in claim 1 wherein said step of estimating said zeta times further comprising the step of estimating bounds of said jitter for said packets arriving from all of said sources.

8. The method as recited in claim 1 further comprising the step of estimating frequency offsets of clocks of said sources with respect to clock of said receiver, said frequency offsets are used to improve estimation of said zeta times and shorten said reference intervals.

9. The method as recited in claim 1 further comprising the step of estimating signs of said frequency offsets of said clocks of said sources with respect to said clock of said receiver, said signs of said frequency offsets are used to improve estimation of said zeta times and shorten said reference intervals.

10. An apparatus for identifying packets to belong in a fusion set, said packets arriving at a receiver transmitted from different sources in a packet based computer network, the apparatus comprising:

means for transmitting said packets from each source to said receiver, and at least one of said sources transmits said packets non-continuously;

means for estimating zeta times of arriving said packets from each source at said receiver, wherein said zeta times are defined as: $t_{z,n}^i = t_{ref,n}^i + X^i$, wherein $t_{z,n}^i$ is said n'th zeta time from source i, $t_{ref,n}^i$ is n'th expected arrival time of packet from said source i (reference time), and time $X^1$ is a real number which is constant for packets from same said source i;

means for dividing time at said receiver in reference intervals; and means for determining said fusion set of said zeta times, said zeta times belonging to same said fusion set also belong to same said reference interval.

11. The apparatus as recited in claim 10 further comprising means for delaying said packets whose said zeta times belong to same said fusion set a minimum but large enough time to compensate for:

variable transmission delays or jitter among said packets transmitted from same said source, and said packets belonging to same said fusion set to be synchronized among themselves according to requirements of a specific real time network application.

12. The apparatus as recited in claim 10 further comprising means for reducing said reference interval by sending a feedback packet to each one of said sources, said feedback packet containing information related to position of said zeta time within its corresponding said reference interval.

13. The apparatus as recited in claim 10 wherein said means of transmitting said packets from each source to said receiver further comprises means for said sources transmitting said packets to said receiver periodically, said transmission periods are multiple integer of a fundamental period, said multiple integer includes integer one.

14. The apparatus as recited in claim 10 further comprising:

means for attaching a sequence number to said transmitting packet at said source;

means for denoting each said reference interval at said receiver with a sequence number; and means for mapping said sequence numbers of said reference intervals with said sequence numbers of said transmitting packets, said zeta time of said packet whose said sequence number mapped with said sequence number of said reference interval is within said mapped reference interval.

15. The apparatus as recited in claim 10 wherein said means of estimating said zeta times further comprises means of estimating time delays from each of said sources to said receiver, said time delays are used to determine said times $X^i$ for each said source i.

16. The apparatus as recited in claim 10 wherein said means of estimating said zeta times further comprising means of estimating bounds of said jitter for said packets arriving from all of said sources.

17. The apparatus as recited in claim 10 further comprising means of estimating frequency offsets of clocks of said sources with respect to clock of said receiver, said frequency offsets are used to improve estimation of said zeta times and shorten said reference intervals.

18. The apparatus as recited in claim 10 further comprising means of estimating signs of said frequency offsets of said clocks of said sources with respect to said clock of said receiver, said signs of said frequency offsets are used to improve estimation of said zeta times and shorten said reference intervals.

19. A method for transmitting packets from sender to receiver in a packet based computer network, the method comprising the steps of:

transmitting said packets from said sender non-continuously;

estimating reference times (expected arrival times $t_{ref,n}$) and maximum bound of network jitter of said packets at said receiver, wherein said estimated maximum bound of network jitter ($\hat{\Delta}_{max}$) is defined as the maximum difference of a packet arrival time ($t_n$) from its corresponding reference time;

said packet is played back at said receiver a time interval after its corresponding said reference time, length of said time interval equals length of said estimated maximum bound of network jitter plus an error term.

20. The method as recited in claim 19 further comprising the steps of:

said sender attaching a sequence number to said transmitting packets;

dividing time at said receiver in reference intervals and denoting said reference intervals with a sequence number;

mapping said sequence numbers of said transmitting packets with said sequence numbers of said reference intervals at said receiver, said reference time of said packet whose said sequence number mapped with said sequence number of said reference interval is within said mapped reference interval.

21. The method as recited in claim 19 further comprising the step of estimating frequency offset of clock of said sender with respect to clock of said receiver, said frequency offset is used to improve estimation of said reference times and shorten said error term.

22. The method as recited in claim 19 further comprising the step of estimating sign of said frequency offset of said clock of said sender with respect to said clock of said receiver, said sign of said frequency offset is used to improve estimation of said reference times and shorten said error term.

23. An apparatus for transmitting packets from sender to receiver in a packet based computer network, the apparatus comprising:

means for transmitting said packets from said sender non-continuously;

means for estimating reference times (expected arrival times $t_{ref,n}$) and maximum bound of network jitter of said packets at said receiver, wherein said estimated maximum bound of network jitter ($\hat{\Delta}_{max}$) is defined as the maximum difference of a packet arrival time ($t_n$) from its corresponding reference time;

means for playing back said packet at said receiver a time interval after its corresponding said reference time, length of said time interval equals length of said maximum bound of network jitter plus an error term.

24. The apparatus as recited in claim 23 further comprising:

means for attaching a sequence number to said transmitting packets at said sender;

means for dividing time at said receiver in reference intervals and denoting said reference intervals with a sequence number;

means for mapping said sequence numbers of said transmitting packets with said sequence numbers of said reference intervals at said receiver, said reference time of said packet whose said sequence number mapped with said sequence number of said reference interval is within said mapped reference interval.

25. The apparatus as recited in claim 23 further comprising means of estimating frequency offset of clock of said sender with respect to clock of said receiver, said frequency offset is used to improve estimation of said reference times and shorten said error term.

26. The apparatus as recited in claim 23 further comprising means of estimating sign of said frequency offset of said clock of said sender with respect to said clock of said receiver, said sign of said frequency offset is used to improve estimation of said reference times and shorten said error term.

27. A method for identifying packets to belong in a fusion set, said packets arriving at a receiver transmitted from different sources in a packet based computer network, the method comprising the steps of:

transmitting said packets from each source to said receiver;

estimating zeta times of arriving said packets from each source at said receiver, wherein said zeta time is defined as: $t_{z,n}^i = t_{ref,n}^i + X^i$, wherein $t_{z,n}^i$ is said n'th zeta time from source i, $t_{ref,n}^i$ is n'th expected arrival time of packet from said source i (reference time), and time $X^i$ is a real number which is constant for packets from same said source i;

dividing time at said receiver in reference intervals;

determining said fusion set of said zeta times, said zeta times belonging to same said fusion set also belong to same said reference interval; and reducing said reference interval by sending a feedback packet to each one of said sources, said feedback packet containing information related to position of said zeta time within its corresponding said reference interval.

28. The method as recited in claim 27 further comprising the step of delaying said packets whose said zeta times belong to same said fusion set a minimum but large enough time to compensate for:

variable transmission delays or jitter among said packets transmitted from same said source, and said packets belonging to same said fusion set to be synchronized among themselves according to requirements of a specific real time network application.

29. The method as recited in claim 27 further comprises the steps of:

attaching a sequence number to said transmitting packet at said source;

denoting each said reference interval at said receiver with a sequence number; and mapping said sequence numbers of said reference intervals with said sequence numbers of said transmitting packets, said zeta time of said packet whose said sequence number mapped with said sequence number of said reference interval is within said mapped reference interval.

30. The method as recited in claim 27 wherein said step of estimating said zeta time further comprises the step of estimating time delays from each of said sources to said receiver, said time delays are used to determine said times $X^i$ for each said source i.

31. The method as recited in claim 27 further comprising the step of estimating frequency offsets of clocks of said sources with respect to clock of said receiver, said frequency offsets are used to improve estimation of said zeta times and shorten said reference intervals.

32. An apparatus for identifying packets to belong in a fusion set, said packets arriving at a receiver transmitted from different sources in a packet based computer network, the apparatus comprising:

means for transmitting said packets from each source to said receiver;

means for estimating zeta times of arriving said packets from each source at said receiver, wherein said zeta times are defined as: $t_{z,n}^i = t_{ref,n}^i + X^i$, wherein $t_{z,n}^i$ is said n'th zeta time from source i, $t_{ref,n}^i$ is n'th expected arrival time of packet from said source i (reference time), and time $X^i$ is a real number which is constant for packets from same said source i;

means for dividing time at said receiver in reference intervals;

means for determining said fusion set of said zeta times, said zeta times belonging to same said fusion set also belong to same said reference interval; and means for reducing said reference interval by sending a feedback packet to each one of said sources, said feedback packet containing information related to position of said zeta time within its corresponding said reference interval.

33. The apparatus as recited in claim 32 further comprising means for delaying said packets whose said zeta times belong to same said fusion set a minimum but large enough time to compensate for:

variable transmission delays or jitter among said packets transmitted from same said source, and said packets belonging to same said fusion set to be synchronized among themselves according to requirements of a specific real time network application.

34. The apparatus as recited in claim 32 further comprising:

means for attaching a sequence number to said transmitting packets at said sender;

means for dividing time at said receiver in reference intervals and denoting said reference intervals with a sequence number;

means for mapping said sequence numbers of said transmitting packets with said sequence numbers of said reference intervals at said receiver, said reference time of said packet whose said sequence number mapped with said sequence number of said reference interval is within said mapped reference interval.

35. The apparatus as recited in claim 32 wherein said means of estimating said zeta times further comprises means of estimating time delays from each of said sources to said receiver, said time delays are used to determine said times $X^i$ for each said source i.

36. The apparatus as recited in claim 32 further comprising means of estimating frequency offsets of clocks of said sources with respect to clock of said receiver, said frequency offsets are used to improve estimation of said zeta times and shorten said reference intervals.

* * * * *